(No Model.)
L. B. CLAPP.
FRICTION CLUTCH.
No. 415,997.  Patented Nov. 26, 1889.
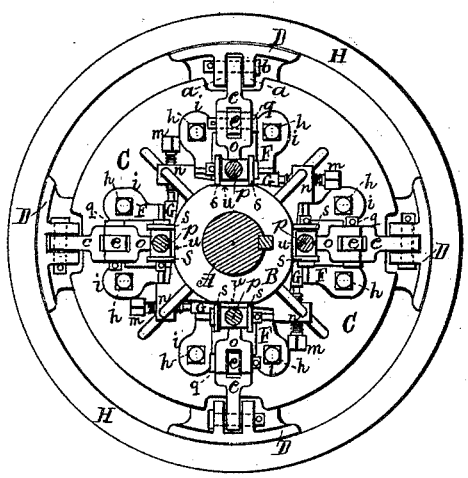
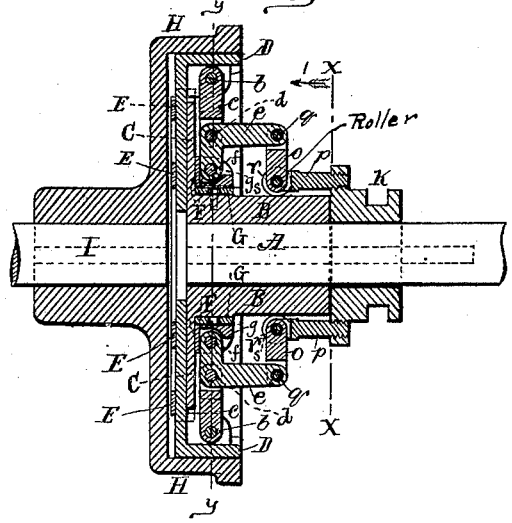
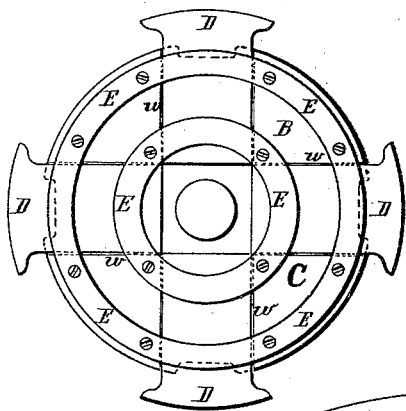
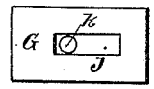
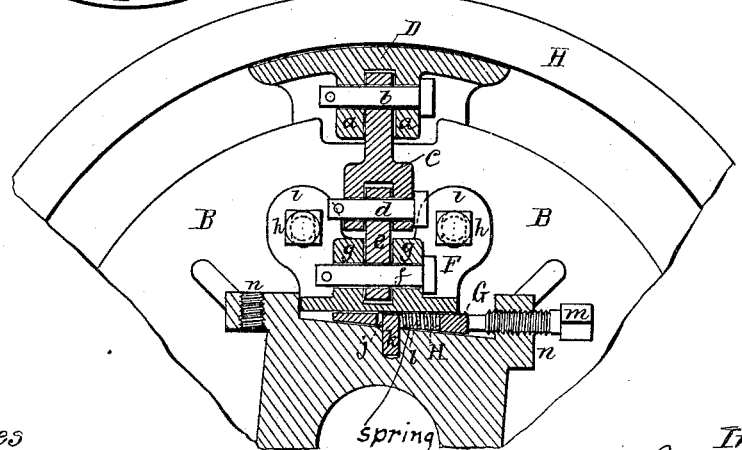
Witnesses
Thos. W. Hobday
C. F. Daniels
Inventor
Lewis B. Clapp
by Singleton & Piper, attys.

UNITED STATES PATENT OFFICE.

LEWIS B. CLAPP, OF FITCHBURG, MASSACHUSETTS.

FRICTION-CLUTCH.

SPECIFICATION forming part of Letters Patent No. 415,997, dated November 26, 1889.

Application filed April 22, 1889. Serial No. 308,164. (No model.)

*To all whom it may concern:*

Be it known that I, LEWIS B. CLAPP, a citizen of the United States, residing at Fitchburg, in the county of Worcester and State of Massachusetts, have invented certain new and useful Improvements in Friction-Clutches; and I do declare the following to be a full, clear, and exact description of the invention, such as will enable others skilled in the art to which it appertains to make and use the same, reference being had to the accompanying drawings, and to the letters of reference marked thereon, which form a part of this specification.

The nature of my invention is defined in the claim hereinafter presented.

Figure 1 is a medium and longitudinal section of a friction-clutch as made in accordance with my invention. Fig. 2 is a transverse section of it taken on line $x\ x$ of Fig. 1, looking in the direction indicated by arrow 1 at top of said line. Fig. 3 is a view of the side of the flange C opposite to that shown in Fig. 2. Fig. 4 is a transverse section on line $y\ y$ of Fig. 1, on an enlarged scale, of a portion of the mechanism of the clutch. Fig. 5 is a top view of one of the wedges used in said clutch.

In the drawings, A denotes a shaft, arranged on and keyed to which is a hub B, from which extends at right angles to the axis of said shaft a circular flange C, said flange having a series of grooves $w$ formed in it, which serve as bearings for the shanks of slides D, a series of four of said slides being shown in the drawings. Two flat rings E E are arranged on the inner face of the flange C, and are secured thereto between the grooves $w$, to retain the shanks of the slides D within the said grooves, the heads of the said slides being formed on their outer surface to fit to the inner periphery of a chambered wheel H, fixed to a shaft I, the axis of which is coincident with that of the shaft A. Each slide D has two ears $a\ a$, to which is pivoted at $b$ a forked link $c$, which in turn receives in its fork and is jointed at $d$ to a right-angular lever $e$, the shorter arm of said lever $e$ being pivoted at $f$ to two ears $g\ g$, forming a part of an adjustable abutment F, which is secured to the outer face of the flange C by bolts $h\ h$. Said bolts pass through slots in the ears $i\ i$ of said abutment and screw into the flange C, the heads of said bolts bearing against the ears $i\ i$ with sufficient force to hold the abutment in position. The abutments F, on the side of them next the hub B, each bear against one side of a wedge G, the other side of said wedges bearing on the inclined surfaces H, formed on the hub, in manner as shown in Fig. 4. The said wedges G, one of which is shown in top view in Fig. 5, are provided with a slot $j$, which receives a pin $k$, that is secured to the hub and extends above the incline and serves to keep the wedges in position, their inner edge resting against the flange C. A spring $l$, arranged in the slot $j$, bears at one end against one end of the said slot and at its other end against the pin $k$, as shown, and bearing against the thicker end of each wedge is a set-screw $m$, which screws through a lug $n$ integral with the hub and flange. By loosening the screws $h$ and revolving the screws $m$, the wedges G can be made to so adjust the abutments F as to compensate for any wear of the faces of the slides D, or so as to increase the pressure of said faces against the inner face of the chambered wheel H. Pivoted to the outer end of each of the right-angular levers $e$ at $q$ is the forked end of a link $o$, the other end of said link being pivoted at $r$ to a forked arm $p$, secured to a slide K, said slide being arranged on the shaft A so that it can be moved lengthwise thereon to operate the clutch to connect or disconnect the two shafts A and I. On the pivot $r$ of each fork $p$ are arranged two friction-wheels $s\ s$, the faces of which bear on one of the flat faces $u$, formed on the hub B for said wheels to roll upon when the slide K is moved to operate the clutch.

From the foregoing it will be seen that owing to the construction and arrangement of parts I have produced a friction-clutch of great power, one that is particularly adapted for heavy machinery.

Having described my invention, what I claim is—

The friction-clutch, substantially as described, it consisting of the hub B, secured to a shaft, said hub being provided with the flat faces $u$, inclines H, lugs $n$, and flange C, provided with grooves, the slides D, having shanks sustained in and to move in said grooves, the abutments F, secured to the flange, the wedges G and screws *m* for adjusting said abutments, the links *c* and levers *e*, pivoted to the slides and abutments and to each other, the links *o*, pivoted to the levers and to arms *p*, fixed to slide K, the wheels *s*, pivoted to arms *p*, to roll on faces *u*, the slide K, to operate the mechanism connected to the shaft A, and the chambered wheel H, fixed to the shaft I, all essentially as set forth and represented.

In testimony whereof I affix my signature in presence of two witnesses.

LEWIS B. CLAPP.

Witnesses:
GEORGE ROBBINS,
JAMES H. McMAHON.